(12) United States Patent
Bares et al.

(10) Patent No.: US 7,110,143 B2
(45) Date of Patent: Sep. 19, 2006

(54) ACCURATE PRINTING OF PROPRIETARY MARK PATTERNS AND COLORS

(75) Inventors: Jan Bares, Webster, NY (US); Michael R. Furst, Rochester, NY (US); Lingappa K. Mestha, Fairport, NY (US); Steven J. Harrington, Webster, NY (US); Eric Jackson, Penfield, NY (US)

(73) Assignee: Xerox Corporation, Stamford, CT (US)

( * ) Notice: Subject to any disclaimer, the term of this patent is extended or adjusted under 35 U.S.C. 154(b) by 950 days.

(21) Appl. No.: 09/731,207

(22) Filed: Dec. 6, 2000

(65) Prior Publication Data

US 2002/0093684 A1    Jul. 18, 2002

(51) Int. Cl.
*G06K 15/00* (2006.01)
(52) U.S. Cl. .................. 358/2.1; 358/1.18; 715/528
(58) Field of Classification Search ............... 358/2.1, 358/1.15, 1.1, 1.11–1.14, 1.9, 1.18; 715/528; 382/205, 232, 100–101
See application file for complete search history.

(56) References Cited

U.S. PATENT DOCUMENTS

| | | | |
|---|---|---|---|
| 5,045,967 A * | 9/1991 | Igarashi ..................... 345/589 |
| 5,317,373 A | 5/1994 | Bares |
| 5,452,094 A * | 9/1995 | Ebner et al. ................. 358/296 |
| 6,025,862 A * | 2/2000 | Thompson ................... 347/232 |
| 6,081,276 A | 6/2000 | Delp |
| 6,327,388 B1 * | 12/2001 | Zhou et al. .................. 382/204 |
| 6,396,594 B1 * | 5/2002 | French et al. .............. 358/1.18 |
| 6,456,395 B1 * | 9/2002 | Ringness .................... 358/1.9 |
| 6,657,647 B1 * | 12/2003 | Bright ........................ 715/856 |

FOREIGN PATENT DOCUMENTS

EP     0 619 555 A2    10/1994

\* cited by examiner

*Primary Examiner*—King Y. Poon
*Assistant Examiner*—Thierry L. Pham
(74) *Attorney, Agent, or Firm*—Fay, Sharpe, Fagan, Minnich & McKee, LLP

(57) ABSTRACT

A printing system accurately prints proprietary marks and selected colors. A dictionary of recognizable patterns and defined colors corresponding to the proprietary marks and selected colors is linked to a user interface wherein a user may designate a location within a document and at least one of the proprietary marks with defined colors from an accessible menu. A processor associates the defined colors with the image at the specified location and generates a printer signal representative thereof. Alternatively, the processor includes a pattern recognizer for identifying recognizable patterns within a document. The patterns have a likeness to defined patterns within a pattern dictionary and can be converted to the defined patterns for display or imaging.

15 Claims, 2 Drawing Sheets

ACCURATE PRINTING OF PROPRIETARY MARK PATTERNS AND COLORS

FIELD OF THE PRESENT INVENTION

The present invention relates to imaging systems and particularly color printing systems. More specifically, the present invention relates to the convenient identification and accurate printing of registered trademark patterns and colors with a user interface access for enabling accurate and definite use of proprietary designations.

BACKGROUND OF THE PRESENT INVENTION

Image information, particularly printed black and white or color, is normally represented in gray level formats containing a large number of levels, e.g.: 256 levels for black and white and more than 16 million (256 cubed) levels of color. Such color levels are clearly not all printable by standard printers or displayable in electrical devices, and so some selection process is necessary to choose those limited number of available colors which are actually to be viewed.

Many well known commercial enterprises have proprietary marks which are commonly used as an identifier of most goods or services of the entity, and thus are almost universally included in all commercial materials and correspondence. Most such designations are registered trademarks. For example, the Xerox red pixelated design "X" (Trademark Registrations Nos. 2,077,700 and 2,078,823, Pantone® 032), the lined design IBM blue (Registration No. 1,205,090, Pantone® 3718) or the PEPSI® fanciful design (Registration No. 2,321,907) are "famous" marks and recognizable patterns. The specific colors are also very important and usually part of the corporate identity, and so should be accurately printed or displayed. For example, the PEPSI® red is a different red than the COCA COLA® red. The reason owners of such valuable designations are particularly concerned about the accurate display and printing of their marks, is because the imaging can occur over a variety of different systems and practiced by a variety of different clients and customers. A failure in accurate printing can dilute a mark's distinctive nature. Consistent accuracy in the imaging of such marks enhances the distinguishing nature of the mark and protects and maintains its integrity and value.

Printing systems are known where a customer can specify a location in an image for a particular pattern printed in a required color (see related pending application Ser. No. 09/221,996). Any such customer specification though, requires defined color space coordinates or a color name (e.g., Pantone®) or reference image as a recognizable pattern. Such systems are usually fairly accurate in guaranteeing the desired results, however, they are not practical enough for most commercial printing operations. There is a need for a system which can simplify the definition of desired registered colors for minimizing delays in the commercial printing environment where there is a stream of documents to be printed containing a variety of registered trademark patterns and colors.

To implement such a system, a print engine or system requires a means for conveniently storing an accessing definition of registered patterns and colors versus color space coordinates or Pantone® names and pattern names for identifying the accurate colors to be printed where such colors mostly will occur and what shape or pattern they will form. Importantly though, an interface must conveniently permit a user to designate when a proprietary color is to be imaged by identification of the mark in association with the appropriate pattern and color. The successful control of the tagging, tracking and guaranteeing of the desired color in a simple and convenient user interface is the subject of the present invention.

SUMMARY OF THE PRESENT INVENTION

A first aspect of the present invention is a color management system for enabling definition and imaging of selected proprietary colors. The system comprises a dictionary of color definitions and a user interface for selecting a portion of a document to be imaged as a defined color and for accessing the dictionary for associating the selected portion with the defined color. The dictionary is preferably provided to a user as a menu of the colored definitions selectively displayed wherein the associating comprises the user matching the defined color from the menu to the portion of the document. The dictionary may also comprise merely a hypertext link to another network site where the color is specifically defined. Such linking is advantageous in networked printers and displays where document size reduction is important.

A second aspect of the present invention comprises a defined set of recognizable patterns and a pattern recognizer for recognizing the selected portion in the document as a part of one of the recognizable patterns wherein the one recognizable pattern is imaged as the defined color. The pattern and the color are intended to be registered or at least proprietary marks.

In accordance with a more limited aspect of the present invention, the dictionary comprises a link between a common language entry to corresponding color spaced coordinates. The common language entry is displayed to a user as a menu item. The color spacer coordinates are preferably matched to a Pantone® color system. In addition, the common language entry may also be associated with a corresponding pattern, i.e., design of the mark to be displayed in the document at the selected portion.

In accordance with another aspect of the present invention, a method is provided for conveniently printing within a document an identification mark comprising a recognizable pattern and a corresponding color in a selected location in a document. The method comprises the steps of selecting a location within the document for the mark. A menu item is selected representing the mark. The menu item is tagged to a dictionary defining the mark and the corresponding color, and the mark and the corresponding color are printed at the selected location. The tagging preferably includes identifying the recognizable pattern within the document corresponding to the identification mark at the selected location within the document.

In accordance with more limited aspects of the present invention, the corresponding colors are computed as color coordinates in accordance with the spectral properties of available print inks and defined viewing conditions for the document. Preferably, the system executes a calibrating routine that includes executing the printing with a test pattern including the corresponding color for the accurate printing of that color at a user-designed time.

Further objects and advantages of the present invention will become apparent from the following descriptions of the various embodiments and characteristic features of the present invention.

DETAILED DESCRIPTION OF THE PRESENT INVENTION

Figure 1:
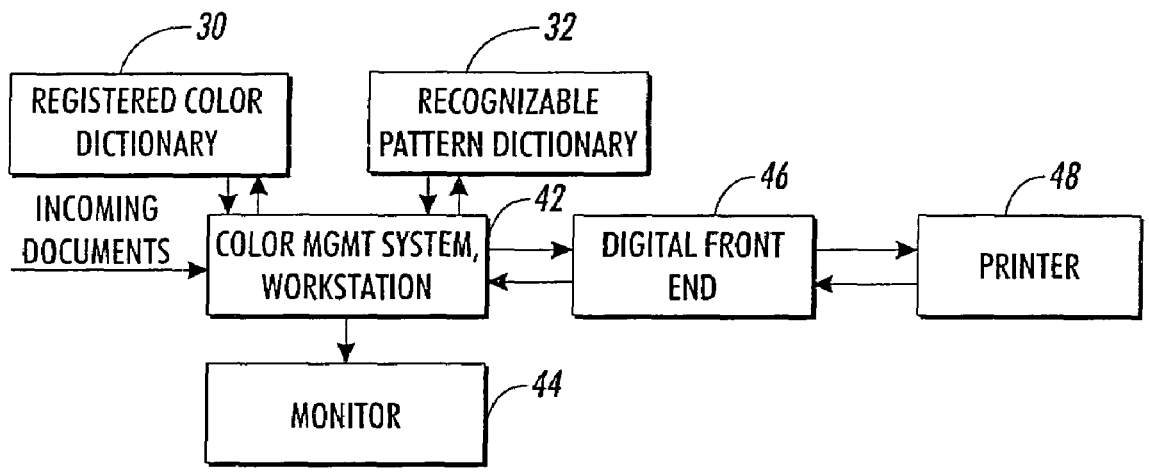
FIG. 1 is a block diagram illustrating one embodiment of the invention for accurate printing of registered trademarks and proprietary colors.

Referring now to the drawings where the showings are for purposes of illustrating the invention and not for limiting same, the present invention is directed to a system for simplifying the access and definition of registered color and/or patterns for minimizing delays in a document creation and printing process workflow where a user requires a highly accurate image of the color or pattern. A dictionary comprised of registered colors, patterns or combinations thereof versus color space coordinates and/or Pantone® identification is conveniently accessible in either a local or network system capable of existing name/color matches as well as accepting new ones to be selectively entered. The user designates the color by clicking on the image element (specific pixel) and then on the name on a pull-down menu with data supplied by said server. The color (or pattern) so selected is subsequently, tagged, tracked and guaranteed by the control system. This system allows network management and sharing of specified "important colors" in the local, intranet, or internet network communities and supplies the additional information to enable advanced color management concepts.

Figure 2:
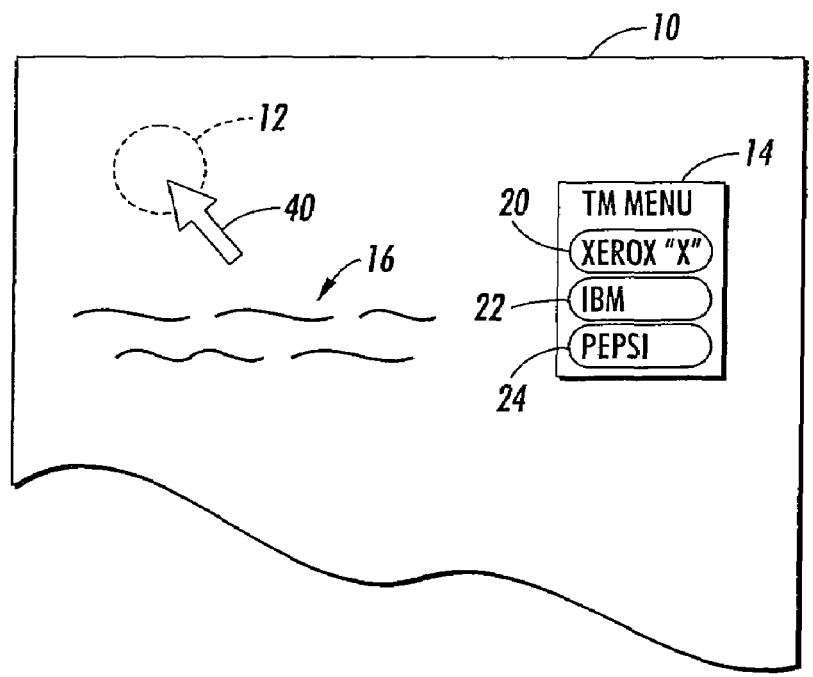
FIG. 2 shows a graphical representation of a user display and interface for facilitating location, access and designation of registered marks and colors on a display.

With particular reference to FIGS. 1 and 2, when a user desires to image or print a certain document 10, the document may contain a location 12 where the user wants a particular color or pattern to be included. Common examples of such items are the fanciful pixelated Xerox "X®" having a particular red identity (Pantone® 032) or IBM® in a particular blue (Pantone® 3718). FIG. 2 shows some of these exemplary marks as displayed to a user in a side bar menu 14 in a common language designation which may comprise at least a part of the mark itself. Assuming document 10 can be, for example, some advertising and promotional item including miscellaneous text 16, and the user is particularly interested in including on the display image or printed document the Xerox pixelated "X" in Pantone® 032 the user may merely access menu 14 as a convenient interface for defining the appropriate designation at location 12. The menu 14 is comprised of the common language entries 20, 22, 24 each identifying a particular registered designation defined in dictionaries 30, 32. User identification can be implemented by conventional cursor control 40, although there are other means of system implementation within the scope of the invention, as will be explained below.

The convenience to the user is that the interface merely requires designation of location 12 and identification of a registered mark or pattern 20, 22, 24, in either order, so that when a document is imaged or displayed, an accurate representation of the appropriate pattern and color is seen by the user. Prior requirements of user identification of color space coordinates, color name, (Pantone® number) or an image pattern are avoided.

In FIG. 1, the common language entries identifying the desired marks or colors are defined by color dictionary 30 and pattern dictionary 32. These dictionaries can be placed in a local or network system capable of serving existing names/color matches as well as accepting new ones to be entered. Alternatively, the entry could be a hypertext link to a remote networked site where the mark or color is adequately defined. Such linking is advantageous for networked printers or displays where reduction in local memory consumption for the dictionaries 30, 32 is desired. Color management system workstation 42 communicates with dictionaries 30 and 32 and generates the user display interface (FIG. 2) onto the monitor 44. The workstation includes a processor linking the location 12 and the designated mark or color 20, 22, 24 to a corresponding definition in the dictionary for generating a signal representative of the desired user display or printing to the digital front end 46 of the printer 48. The front-end 46 converts the signal into an appropriate printer control signal as is well known in the art. The workstation 42 may also comprise a scanner where incoming documents can be converted into control signals representative thereof, also in a manner that is well known in the art.

The present invention simplifies the provision of a registered color definition, or a proprietary and recognizable pattern, and thereby minimizes delays in a commercial printing environment where there is a stream of to-be-printed documents containing registered trademark colors by a variety of printing clients. Instead of having to specify appropriate color space coordinates the menu 14 links the identified designations 20, 22, 24 to appropriate color space coordinates or Pantone® names as well as the pattern in which such colors mostly occur. Thus, the link is not only to proprietary colors, but also to recognizable patterns. By merely designating the color by clicking on representative image element in the document or its location 12 (or any pixel contained therein), and then on a representative identity from the pull-down or side bar menu 14, the color so selected can be subsequently tagged, tracked and guaranteed by the control system.

The workstation 42 also acts as a pattern recognizer for recognizing a user selected portion of the document as a part of one of the defined recognizable patterns in the dictionary 32. Such a pattern may be associated with one of the defined colors in the color dictionary 30.

Alternatively, the user can select a default operating mode where one "clicks" merely on the main menu 14, or in any of the particular marks displayed therein, 20, 22, 24, for example, "Xerox red". The designation 20, 22, 24 may either be in the appropriate color or may include a textual definition (not shown) thereof. The user designation indexes on all stored patterns that are usually rendered in "Xerox red" and applies pattern recognition algorithms in workstation 42 to identity the intended patterns (e.g., the Xerox pixelated red "X") in the image and assigns to such a pattern the corresponding defined color. The control system within the workstation 42 can also cause the system to track such color in the set up/calibration process (e.g., test patterns in the corresponding color), so that an initial calibration print or display, or in real time on customer prints the actual printed or displayed color can be measured to be the defined color. A built in spectrophotometer (not shown) can effect the appropriate measurement. As to pattern recognition, each logo, fanciful design, text pattern or trademark requires its own set of pattern recognition algorithms. While the design of such algorithms may be complex in some cases, it is generally possible and represents a routine task in many sample patterns. As an example designing a scale and rotation invariant recognition algorithms for the Xerox "X" would be an easily appreciable example of utilizing Hough transforms.

Figure 3:
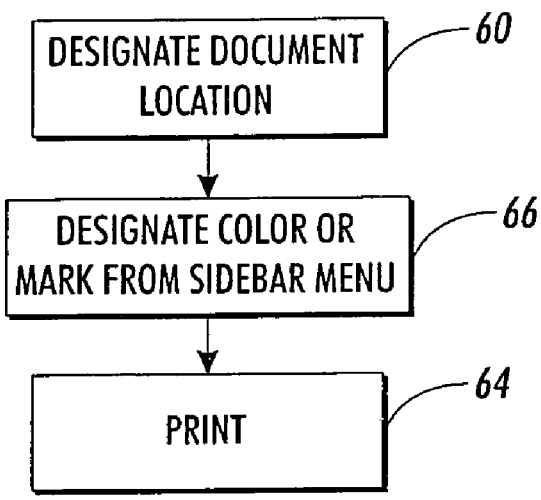
FIG. 3 is a flowchart illustrating steps in practicing one embodiment of the method of the invention; and, FIG. 4 is a flowchart illustrating the steps of another embodiment.
Figure 4:
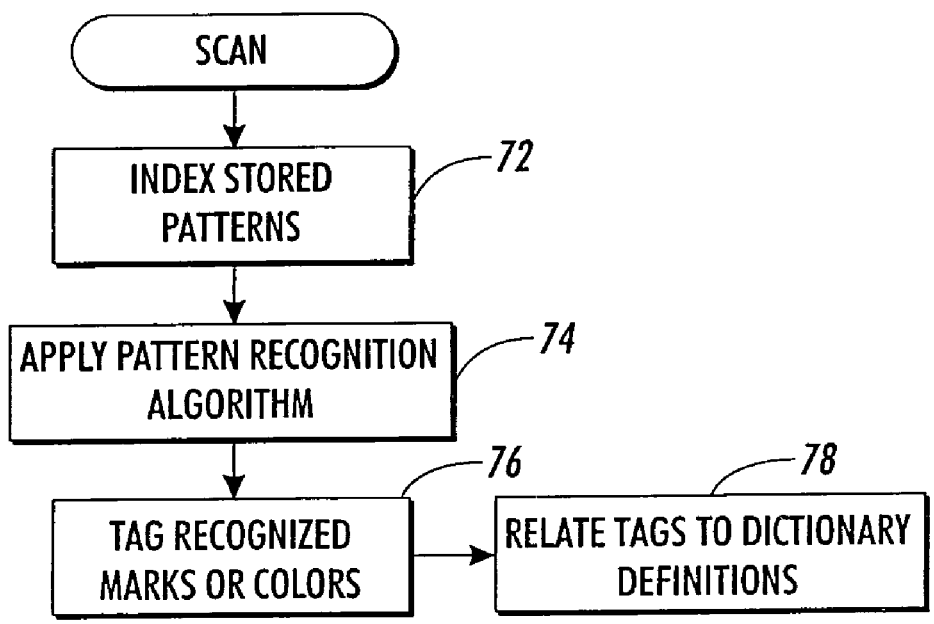

With particular reference to FIGS. 3 and 4, flowcharts illustrating the important process steps for two methods practiced in the course of the present are illustrated. In FIG. 3, a user designates 60 a document location such as is shown in FIG. 2 to the workstation 42. The user also designates from the trademark menu 14 a color or pattern representing a proprietary mark that is to be printed or displayed at the designated location. Thereafter, the system can print 64. The simplicity and convenience of the interface is evident by the user merely accessing two items in the interface, the location and the mark. The previous storage in the dictionary 30, 32 of the marks or colors represented by the user access of the menu obviates the user having to do anything to supply the appropriate pattern definitions or color definitions at the time of printing. FIG. 3 also includes a calibration step 66 for the printer 48. In the preferred embodiment, calibration is effected with at least some of the defined colors within the registered color dictionary 30 to further assure that commercial printing will satisfy user demand. The defined colors contained in the system as registered colors or custom colors within the dictionary 30 are preferably represented by patches on a calibration or printer setup pattern. The color test patterns (not shown) are utilized in a conventional manner as an automatic control system from time to time to either create the printer profile (ICC profile or CRD-Color Rendering Dictionary) or to set up the printer, or to maintain printer fidelity in real time.

With reference to FIG. 4, an alternative embodiment of the invention is illustrated with reference to pattern recognition for identifying likenesses to fanciful design marks (pixels of the bit map or objects in a TDL/PDF file). A document or signal representation thereof can be scanned for likely colors or qualifying patterns. The stored patterns within the dictionaries 30, 32 are indexed 72 and compared for applying the pattern recognition algorithm 74 in a manner similarly as discussed above. If a recognized mark or color is identified, it is tagged 76 and linked 78 to the definitions within the dictionaries 30, 32. The likeness can then be converted to the dictionary definition. With such a system, a default mode can be implemented wherein an entire document can be selected for scanning for defined colors or marks. For use confirmation, a query mode is implemented where the user is queried as follows, e.g.: (1) A recognized trademark is black or in non-specified color, "do you want the color changed to registered color?", (2) The identified logo/trademark color is not accurate, "do you want it in the registered color?", (3) "Do you want the identified logos/trademarks in registered colors?", (4) "Do you want only selected or the identified logos/trademarks in registered colors?", (5) "Do you want the colors of identified logos/trademarks ignored?"

The color dictionary preferably comprises defined colors stored with their colormetric color descriptors such as their tristimulus values, L*, a*, b*, or spectral values so that the control system can receive these color descriptors as targets. When spectral values are used as targets, the control system will try to provide illumination independent spectrally matched color reproduction. On the other hand, if the system can be made aware of defined viewing conditions for a particular document including illumination, the defined colors can be defined by spectral information and mixing rules for specified colorants or inks comprising the defined color corresponding to the viewing conditions. Alternatively, the dictionary may contain several special information definitions as distinct outcomes, each corresponding to a specified viewing condition. It is also within the scope of the invention to define the displayed colors for monitor viewing as color coordinates matched to the viewing monitor and monitor viewing conditions.

A specific part of the dictionary would refer to the user interface—the registered color will be seen on the monitor in accordance with however the color is defined, i.e., the color dictionary will supply for the display the color coordinates matching the monitor type and condition and the viewing conditions.

A system of shared "trademark colors" available on an enterprise wide basis has the additional advantage of being able to calibrate an entire enterprise's printing systems to a common set of company defined "critical colors". Clearly, the invention is not limited to the embodiments specified above and many variants concerning color storage, trademark/logo pattern storage, logo pattern recognition or processing algorithms, as well as the test pattern construction and use, will be apparent to those skilled in the art.

The invention has been described with reference to preferred embodiments. Obviously, alterations and modifications will occur to those upon reading and understanding this specification. It is our intention to include all such alterations and modifications insofar as they come within the scope of the appended claims or equivalents thereof.

Having thus described our invention, it is now claimed:

1. A printing system comprising:
   a first dictionary which includes recognizable patterns which each corresponds to a proprietary mark;
   a second dictionary which includes definitions of selected colors which each definition corresponds to a color of the proprietary mark and is associated with color space coordinates;
   a user interface, which includes a menu of common language entries which each corresponds to the proprietary mark, for designating a location within a document and a menu item corresponding to the proprietary mark to be printed at the designated location;
   a processor for linking the designated location and the menu item representing the designated mark to corresponding entries in the first and second dictionaries, the processor including:
   a pattern recognizer for identifying the recognizable patterns within the document; and
   a printing device for generating the document and printing the designated mark with the color space coordinates of the selected designated proprietary mark at the designated location, the printing system having a default operating mode wherein a document to be printed is scanned for determining any likenesses to the recognizable patterns and wherein each determined likeness is linked to the corresponding entries in the first and second dictionaries for printing each determined likeness as the recognized pattern with associated color space coordinates.

2. The system as defined in claim 1, wherein the selected color comprises a registered trademark.

3. The system as defined in claim 1, wherein the user selects the entire document and the pattern recognizer recognizes all recognizable patterns to be imaged as the selected color of each corresponding recognized pattern.

4. The system as defined in claim 1, wherein the recognizable pattern comprises a registered trademark.

5. The system as defined in claim 1, wherein the color space coordinates are matched to a PANTONE® color system.

6. The system as defined in claim 1, wherein at least one dictionary comprises a hypertext link to a remote website which includes definitions of the selected colors.

7. The printing system as defined in claim 1, wherein the second dictionary further includes:
spectral information and mixing rules for the selected colors.

8. The printing system as defined in claim 1, wherein the second dictionary further comprises:
algorithms for adjusting color coordinates of the selected colors in accordance with at least one of spectral properties of inks used by the printing system, or current viewing conditions for the document.

9. The printing system as defined in claim 1, operated in a xerographic environment.

10. The system as defined in claim 1, further including:
a multiplicity of printing devices, wherein the first and second dictionaries are shared by the printing devices so that each printing device prints each designated mark with globally defined pattern and color at the designated location.

11. A method for printing within a document an identification mark comprising a recognizable pattern and a corresponding distinct mark color at a selected location in a document including:
determining viewing conditions for the document;
selecting a location within the document for the mark to be printed;
selecting a menu item on a user interface which menu item represents the mark;
linking the menu item to a corresponding entry in a dictionary which entry defines the mark and is associated with color space coordinates of the corresponding distinct mark color;
computing the distinct mark color as color coordinates in accordance with spectral properties of available print inks and determined viewing conditions for the document; and,
printing the mark with the computed color space coordinates.

12. The method as claimed in claim 11, further including:
identifying the recognizable pattern within the document corresponding to the mark at the selected location.

13. The method as claimed in claim 12, further including:
forming the dictionary as a set of proprietary marks in association with common language entries comprising a plurality of the menu items which are displayed on the user interface.

14. The method as claimed in claim 11, further including:
calibrating a system by executing the printing with a test pattern including the corresponding distinct mark color.

15. The method as defined in claim 11, wherein the viewing conditions include at least illumination.

* * * * *